March 3, 1970  J. F. ROGERS  3,499,067
METHOD FOR MAKING BRANCHED CONDUITS
Filed Nov. 28, 1967  2 Sheets-Sheet 1

INVENTOR.
John F. Rogers
BY Hood, Herron & Evans
ATTORNEYS

# United States Patent Office 3,499,067
Patented Mar. 3, 1970

1

3,499,067
METHOD FOR MAKING BRANCHED CONDUITS
John F. Rogers, Morehead, Ky., assignor to Lee Clay Products Company, Clearfield, Ky., a corporation of Kentucky
Filed Nov. 28, 1967, Ser. No. 686,156
Int. Cl. B28b 11/02, 7/14, 21/74
U.S. Cl. 264—60                                    10 Claims

ABSTRACT OF THE DISCLOSURE

A method of manufacturing a branched tubular conduit having connecting passageways from a plurality of tubular sections of plastic material which includes pressure welding an end of one tubular section to a side of a second tubular section and simultaneously forming an opening in the side between the section hollows. A length of uncured clay pipe is extruded, an end of the length is cut off to form a main section and a spur section and the spur end is configurated to the main section side. The sections are then aligned in a supporting mold having an inner wall defining a tubular surface which is laterally intersected by another tubular surface for supporting the configurated spur end adjacent the main section side. A first mandrel is introduced into the hollow of the main section and a second mandrel having a cutting edge is then forced into the spur section to weld the spur section to the main section side while simultaneously forming an opening in the side provide the branched conduit.

BACKGROUND OF THE INVENTION

Basically, two methods have been proposed for making branched or T-shaped clay pipes from preformed uncured pipe sections. According to one method, a main pipe section is first notched and then a spur section which has an end configurated to the main pipe notch is joined thereto, usually by slapping the sections together. In the other method, a spur section end is configurated to the side contour of a main pipe section, the spur end is then joined to the main pipe side and thereafter a notch is cut in the main pipe side between the pipe hollows usually by means of a cutting tool inserted through the hollow spur.

Both of these proposed methods have proved unsatisfactory for a number of reasons. In the first mentioned method, both the main and spur sections are configurated before uniting them. Not only does this require rather precise cuts in both sections, but it is difficult to then properly mate the sections especially when trying to achieve a desired placement angle. As a result, inadequate consolidation of clay occurs between the sections which contributes to lack of both joint strength and leak-proofness in the cured final product. While the second mentioned method does not require notching the main section before contact with the spur, the subsequent step of cutting an opening in the main pipe wall through the hollow of the spur usually disturbs whatever contact was first made between the sections. This again results in a finished product having shortcomings similar to those mentioned for the product of the first mentioned method. Also, it has been the common practice in these methods to join or slap the sections together by hand with no good assurance for obtaining the proper joint or weld. Thus, the branches produced tend to be undesirably bent, lack angular uniformity between sections and virtually no two are identical.

Municipalities have become more stringent in their requirements against underground loss of waste or sewage in fluid transportation systems. Therefore, it has been found necessary after firing clay pipes made by the above methods, to apply sealants at the joint of the main and spur sections. This has not been completely satisfactory because sealants which may contribute to the waterproofness of the branch do not necessarily strengthen the joint and the additional technique of sealing adds extra cost.

Other problems have been experienced in known techniques for producing branched pipes from preformed pipe sections, particularly where the lateral entrance in the main section connecting with the spur hollow is of smaller transverse cross-section than that of the main section. A typical example is the production of a standard T-shaped clay pipe having a main section with an internal 8 inch diameter and lateral spur entrance of 6 inch internal diameter. Present methods involve the separate extrusion of two pipes having different internal diameters with the external contour of the 6 inch pipe also being smaller than the external contour of the 8 inch pipe. After the pipes are joined and fired, because of different shrinkage rates of the clay pipe compositions in each extrusion, the cured clay at the joint lacks both strength and leak-proofness. Dimensional uniformity between the sections can not be maintained when each section shrinks differently during curing. Moreover, by reason of the disparity in the external contours of the main and spur sections, difficulty is experienced in providing adequate bedding for underground placement.

SUMMARY OF INVENTION

This invention is directed to a method of manufacturing a branched tubular conduit from a plurality of tubular sections of plastic material such as clay. The method according to this invention includes pressure welding an end of a spur section to the side of a main pipe section and simultaneously forming an opening in the main pipe side between the hollows of the sections. This method eliminates the necessity of cutting and notching both sections according to mentioned prior art technique before mating them and the deficiencies involved in that technique. Also, according to this invention, the mentioned shortcomings of known techniques which require cutting an opening in the main pipe side after union with a spur are obviated.

According to this invention, a mold is provided having an inner wall which defines tubular surfaces conforming to the external configuration of the finished branched conduit. For example, the mold wall defines a first tubular surface and a second tubular surface laterally intersecting it, i.e., a T or Y-shaped cavity. Preformed tubular sections of plastic material, i.e., the curable clay main and spur pipes, are provided by extruding a length of tube and cutting of a portion of that same extrusion to form the spur and main sections. An end of the spur section is configurated to substantially conform to the external circumferential contour of the main pipe side. The main and spur pipes are then aligned in the confines of the first and second tubular surfaces of the mold, respectively, with the configurated spur end adjacent the main pipe side. A first mandrel is then introduced into the hollow of the main pipe for supporting the main pipe in the mold against inward deflection and collapse during the subsequent pressure welding and forming steps according to this invention. A second mandrel having a cutting edge is then forced into the confines of the second mold tubular surface to weld the spur section to the main pipe section while pressing the mandrel cutting edge into the main pipe side to form an opening between the hollows of the sections to provide the branched conduit.

The method of this invention provides a branched clay pipe having a number of advantageous properties and also solves problems associated with prior art techniques. In comparison, branched clay pipes produced by this invention possess superior leak-resistance at the junction of the main and spur sections. For example, branched pipes produced by prior art methods of the type discussed above commonly have been found to leak under water pressures on the order of 3-10 feet of head, whereas the branched pipes according to this invention have been tested under water pressures of about 100 feet or more of head without leakage. This leak-proofness obviates the need for sealants.

Moreover, the method of this invention is adaptable to machine production according to apparatus provided by this invention. This permits the production of branches which are dimensionally identical whereas in prior art methods virtually no two are identical because of the deficiencies involved in their production. The branches produced by this invention have spur and main sections which are straight and possess both uniformity of angular connection and placement.

An additional advantageous property of the branches produced from moldable clay materials according to this invention is their uniformity of shrinkage which is demonstrated upon firing or curing the clay branch. It has been found in this connection that when an end is cut from a length of extruded pipe to form the main pipe and spur sections which are then welded, the resultant branched conduit can be cured with uniform shrinkage. Uniformity of shrinkage during curing enhances dimensional uniformity and prevents cracking of the consolidated clay at the junction of the branch.

Branched pipes can also be made according to this invention where the external circumferential contours of the main and spur sections are identical, yet the internal transverse cross-section of the spur hollow at the junction is smaller than that of the main pipe. This permits the production of, for example, an 8 by 6 inch internally dimensioned T-shaped branch which adapts very readily to bedding in underground placement by reason of the external contours of the spur and main sections being identical.

The present invention also provides an apparatus for manufacturing a branched tubular conduit from a plurality of tubular sections of plastic material such as clay. A preferred apparatus includes a mold support for supporting an end of the spur tubular section adjacent the side of the main tubular section. The mold support has an inner wall defining a first tubular surface for supporting the main section and a second tubular surface laterally intersecting the first tubular surface for supporting the spur section. The mold surfaces have circumferential contours substantially conforming to the finished branched conduit. A first mandrel is positionable within the confines of the main section for supporting that section within the mold against collapse during the pressure welding and forming of the sections. The external contour of the first mandrel substantially corresponds to the internal contour of the main section. A second mandrel is movable into the confines of the mold surface which supports the spur section for pressure welding the spur to the main section and for simultaneous engagement with the first mandrel to form an opening in the main pipe side between the hollows of the sections.

The drawings further illustrate the method and apparatus for carrying out the invention and the best mode presently contemplated.

Figure 1:
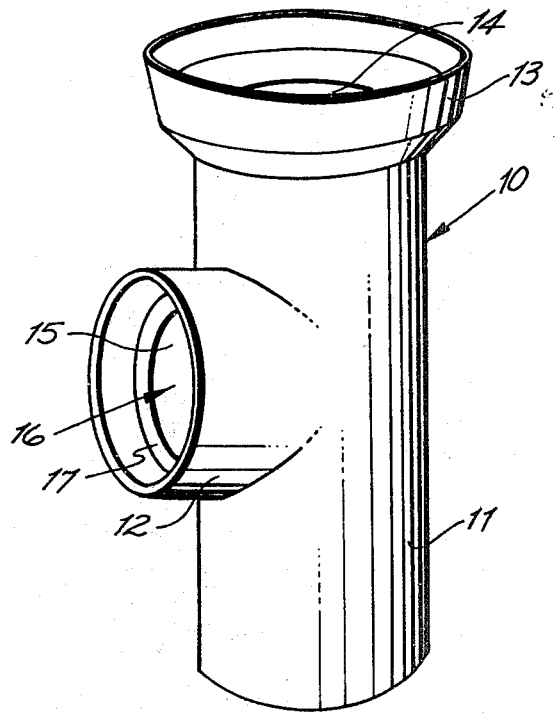
FIGURE 1 is a perspective view of a T-shaped pipe branch.
Figure 5:
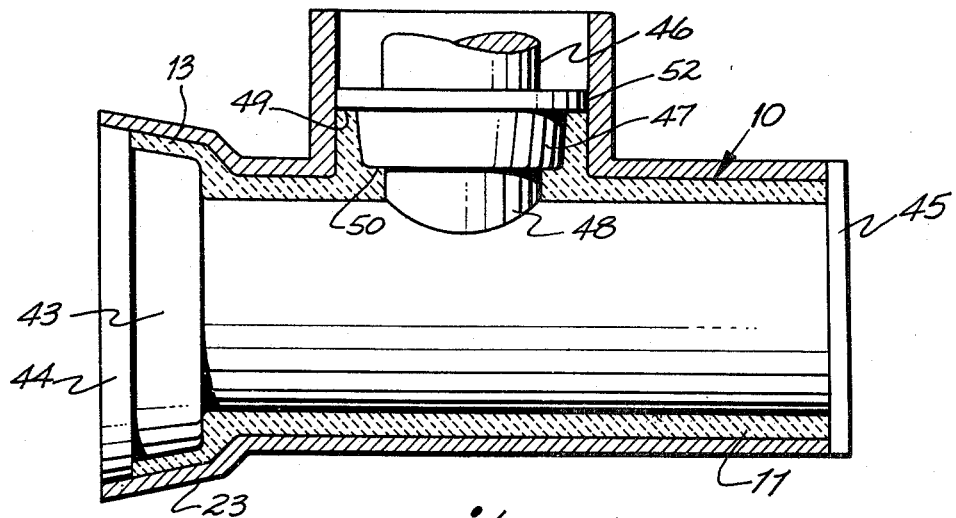
FIGURE 5 is a view similar to FIGURE 4 with the branched conduit shown in FIGURE 1 completed.

Referring to FIGURES 1 and 5 of the drawings, a completed T-shaped branched clay pipe 10 is shown having a main pipe section 11 integrally joined to a spur section 12. The main section 10 has a belled end 13 and an internal passageway 14 which laterally intersects the passageway 15 of the spur section 12. In transverse cross-section, the opening or spur entrance 16 in the side of the main section 11 between the pipe hollows is smaller than the hollow or passageway 14 of the main section, yet the external circumferential contours of the spur section 12 and main section 11 substantially conform. A seat and reinforcing land 17 is formed near the junction of sections.

FIGURES 2-5 illustrate an apparatus of this invention for forming the branched conduit of the type shown in FIGURE 1. The apparatus 20 includes a split mold 21 having an upper half 22 and a lower half 23. The mold half 22 has an integral frame 25 pivotally mounted by extending arms 26 and 27 to arms 28 and 29 of frame 30 for the lower mold half 23. The lower half 23 is supported in operative position by a carriage 31. The upper half 22 of the mold is also mounted to a suitable supporting structure in alignment with the lower half 23 for controlled opening and closing by means not shown.

Figure 2:
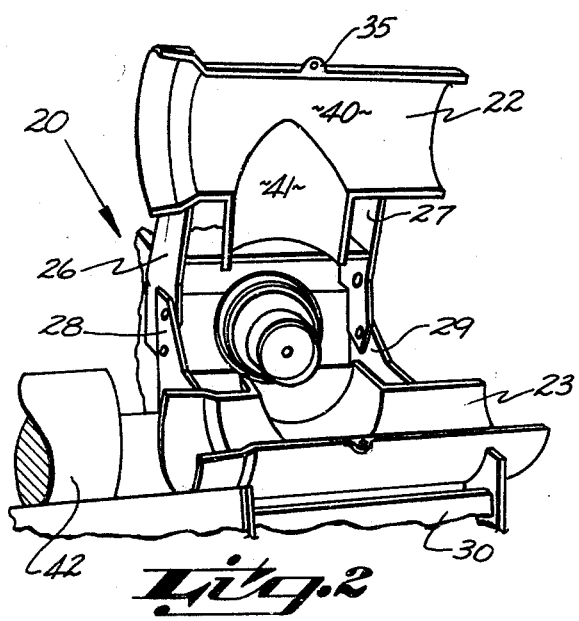
FIGURE 2 is a simplified, fragmentary perspective view of apparatus according to this invention for forming the branched pipe shown in FIGURE 1.

The apparatus is shown in FIGURE 2 with the lower mold half 23 ready for alignment of the main pipe 11 and spur 12 sections therein. When the upper half 22 is moved down over the lower half 23 and locked as in FIGURE 3 by suitable locking means 35, a complete mold 21 is provided for supporting an end of the spur section adjacent the side of the main section (as shown in FIGURE 4). The mold halves 22 and 23 together provide an inner wall defining a first tubular surface 40 for supporting the main pipe section 11 and a second tubular surface 41 laterally interesecting the first surface for supporting the spur section 12. The tubular surfaces 40, 41 of the mold support have circumferential contours substantially corresponding to the external circumferential contours of the main and spur sections. Also, the split mold 21 conforms to the external configuration of the T-shaped conduit 10.

Figure 3:
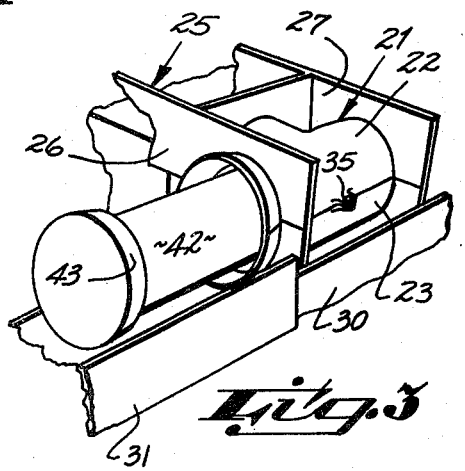
FIGURE 3 is a simplified perspective view, broken away, showing the apparatus of FIGURE 2 during the conduct of the method according to this invention.
Figure 4:
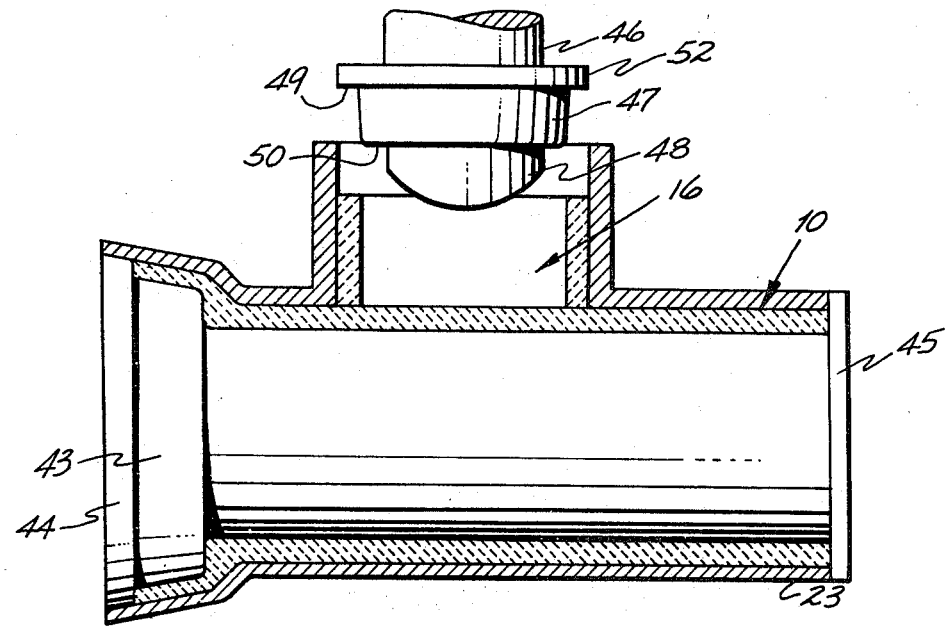
FIGURE 4 is an enlarged fragmentary horizontal section through the mold apparatus shown in FIGURE 3 just prior to the pressure welding and forming of the branched conduit.

A mandrel 42 is positionable within the confines of the mold tubular surface 40 for supporting the main pipe section 11 against inward deflection or collapse during the pressure welding and forming operation of this invention (FIGURES 3-5). Mandrel 42 has an external contour substantially corresponding to the internal contour of the main section 11 and a belled end 43 with integral flange 44 for capping the bell end of a mold tubular surface 40 to prevent endwise extrusion of plastic clay from the mold confines when welding pressures are used which would cause end flow of plastic. In this connection, end cap 45 prevents endwise extrusion from the opposite end of tubular surface 40 under similar conditions.

A second mandrel 46 is movable into the confines of the mold tubular surface 41 for pressure welding the spur section 12 to the main section 11 and for simultaneous engagement with mandrel 42 to form an opening in main pipe section 11 between the section hollows. The second mandrel 46 has a main body 47 having an annular cutting edge portion 48 at one end and a flange portion 49 at the other end. The flange portion 49 has an outer diameter greater than the outer diameter of the body 47. A shoulder 50 is formed between cutting edge portion 48 and body 47. The shoulder 50 provides the seat and reinforcing land 17 of the branch 10 during the pressure welding and forming. The flange portion 49 has a peripheral edge 52 contoured to conform to the internal contour of second tubular surface 41 for slideable movement therein.

In carrying out the process of this invention, the split mold 21 is in the open position as shown in FIGURE 2, with the mandrels 42 and 46 withdrawn. Preformed clay pipe sections 11 and 12 are aligned in the lower half 23 of the split mold 21 as shown in FIGURE 3. In this instance, spur section 12 will be welded to main section 11 with a reinforcing land 17 formed between the sections and a spur entrance 10 formed having a transverse cross-section smaller than the internal transverse cross-section of main section 11. The length of the unwelded spur section 12 is longer than the welded spur 12 (comparing FIGURES 4 and 5). The reduction in length occurs during the welding and forming operation to provide sufficient clay for forming land 17 and reduced entrance 16.

As mentioned, the preformed clay tubular sections are formed by extruding a length of tube and then cutting off an end portion of the tube to form the spur and main sections. A spur end is then configurated to the external circumference of the side of the main section 11. The main section 11 can be belled at its end as shown in FIGURE 3 prior to placement in the mold. After the sections are aligned in the mold lower half 23, the upper mold half 22 is moved down over the lower half 23. The mold halves 22, 23 are then locked in place using lock 35 so that they will not separate during the pressure welding operation which is to follow. The mandrel 42 is then moved into the confines of the main pipe 11 (FIGURES 3 and 4) which is disposed in the confines of the mold tubular surface 40. At this point, the end of the main section 11 within its mold tubular surface 40 is end capped with cap 45 to prevent endwise extrusion of the plastic or clay material as mentioned.

The cutting and welding mandrel 46 is then actuated and moved into the confines of the tubular surface 41 having the spur 12 aligned therein. As the cutting mandrel 46 is introduced, mandrel flange 49 will slideably move into surface 41 and the side of mandrel body 47 and flange portion 49 engage the spur section 12. The clay of spur section 12 is thus forced between mandrel 46 and mold wall into consolidating relationship with the clay of the main section 11 while the entrance 16 is simultaneously formed in the main section side by cutting the clay between cutting edge 48 and mandrel 42. The T-shaped conduit is completed as shown in FIGURE 5.

During this pressure welding and cutting operation, the length of the spur 12 is reduced (as shown by comparison of FIGURES 4 and 5) and the volume of clay provided by the reduction is forced between the mandrel 46 and the wall of the mold 21. This operation provides the reinforcing land 17 formed at the junctions of the main and spur sections and the reduced lateral entrance 16 of the spur. After consolidation, the mold is opened and the formed pipe is removed. The branched conduit 10 is then placed in a suitable oven and heat cured.

Suitable plastic compositions of clay which can be empoyed in the production of the branched pipes according to this invention, and its above detailed description, include those conventionally employed in pipe making. Of course, compositional ranges can be varied within the ordinary skill of the art. For example, a suitable dry mixture of clay material contains about 75% shale and 25% fire clay on a weight basis. These solid ingredients can then be mixed with about 12–17% by weight water to form a moldable mixture which can be extruded to form the length of pipe which can be employed according to this invention. Similarly, other moldable plastic compositions can be formulated. When pressure welding plastic preforms containing clay compositions of the type mentioned, according to the detailed technique just described, welding mandrel pressures on the order of 40–50 tons have been found satisfactory to obtain the desired advantages of this invention. These pressures are applicable under room temperature conditions, i.e., on the order of about 20–25° C. for clay compositions. However, it is to be understood that welding pressures depend upon the consolidating plasticity of the compositions under certain temperatures, and therefore, in the case of thermoplastic compositions, pressures may be reduced at higher temperatures where the ability of the plastic to consolidate increases.

The curing conditions of the green clay branched product are within the purview of one of ordinary skill in the art. For example, when employing clay mixtures of the above type, the pipe is cured under normal atmospheric conditions and elevated temperatures in the range of about 1800–2400° F. in an oven for a suitable length of time (i.e.) about 5–6 days, of course, these conditions can be varied as temperature, pressure and humidity are otherwise controlled.

It is to be understood that there are other modes of carrying out the invention which are within the boundaries of this description and the skill of the art; and having described the presently preferred mode and apparatus, the invention is not to be limited thereto.

What is claimed is:

1. In a method of manufacturing a branched tubular conduit having connecting passageways from a plurality of tubular sections of plastic material, the improvement which comprises, pressure welding an end of a first tubular section to the side of a second tubular section, and simultaneously forming an opening in said side between the hollows of said sections thereby providing said conduit.

2. A method of manufacturing a branched tubular conduit having connecting passageways from a plurality of tubular clay sections comprising:

extruding a length of plastic clay tube, cutting off a portion of said length to form a first section and a second section, and pressure welding an end of said first section to the side of said second section while forming an opening in said side between the hollows of said sections thereby providing said conduit.

3. The method according to claim 2 comprising the further step of heat curing to clay conduit to harden it.

4. The method according to claim 2 comprising the further step of configurating said first section end to substantially conform to the external contour of said section side prior to said pressure welding.

5. A method of manufacturing a branched tubular conduit having connecting passageways from a plurality of tubular clay sections comprising:

extruding a length of plastic clay tube, cutting off a portion of said length to form a first section and a second section, configurating an end of said first section to substantially conform to the external contour of the side of said second section, pressure welding said first section end to said second section side while forming an opening in said side between the hollows of said sections, and heat curing the resultant clay product to harden it thereby providing said conduit.

6. The method according to claim 5 wherein said opening is formed having a transverse cross-section smaller than the transverse cross-section of the hollow of said second section.

7. A method of manufacturing a branched tubular conduit having connecting passageways from plastic material comprising:

providing a mold having an inner wall defining a first tubular surface and a second tubular surface laterally intersecting said first surface, said tubular surfaces conforming to the external configuration of said branched conduit, aligning first and second preformed plastic tubes in the confines of said first and second tubular surfaces respectively, introducing a first mandrel into the hollow of said first tube, and forcing a second mandrel having a cutting edge into the confines of said second tubular surface to weld said second tube to said first tube while pressing said mandrel cutting edge into the side of said first tube to form an opening in said side between the hollows of said tubes whereby said branched conduit is formed.

8. The method according to claim 7 wherein said preformed plastic tubes are made by extruding plastic clay to form a length of tube and cutting off a portion of said length to form said first and second tubes.

9. The method according to claim 8 comprising the further step of configurating an end of said first tube to substantially conform to the external side contour of said second tube and wherein said first tube is aligned in said mold with said end adjacent said second tube side.

10. The method according to claim 9 comprising the further step of heat curing the clay conduit thus formed to harden it.

References Cited

UNITED STATES PATENTS 3,340,337   9/1967   Schulze _____ 264—163 X

ROBERT F. WHITE, Primary Examiner

A. M. SOKAL, Assistant Examiner

U.S. Cl. X.R.

25—35; 264—67, 152, 154, 163, 248